No. 759,935. PATENTED MAY 17, 1904.
H. A. SWENSON.
DRAFTING IMPLEMENT.
APPLICATION FILED DEC. 15, 1902.
NO MODEL. 2 SHEETS—SHEET 1.

Inventor
H. A. Swenson

Witnesses
Chas. K. Davies.
M. E. Brown

By H. A. Bartlett
Attorney

No. 759,935. PATENTED MAY 17, 1904.
H. A. SWENSON.
DRAFTING IMPLEMENT.
APPLICATION FILED DEC. 15, 1902.

NO MODEL. 2 SHEETS—SHEET 2.

Witnesses
Chas. K. Davies.
M. E. Brown.

Inventor
H. A. Swenson
By
W. H. Bartlett
Attorney

No. 759,935. Patented May 17, 1904.

UNITED STATES PATENT OFFICE.

HENRY A. SWENSON, OF LINDSTROM, MINNESOTA.

DRAFTING IMPLEMENT.

SPECIFICATION forming part of Letters Patent No. 759,935, dated May 17, 1904.

Application filed December 15, 1902. Serial No. 135,260. (No model.)

*To all whom it may concern:*

Be it known that I, HENRY A. SWENSON, a citizen of the United States, residing at Lindstrom, Minnesota, have invented certain new and useful Improvements in Drafting Implements, of which the following is a specification.

This invention relates to drafting implements.

The object of the invention is to produce an implement which may be used to lay out circles or curves with definite relation to straight lines or polygonal forms.

Figure 1:
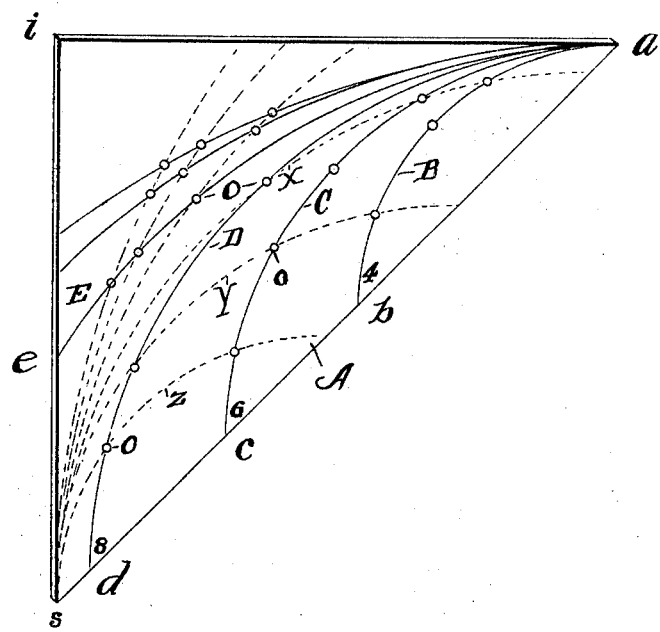
Figure 2:
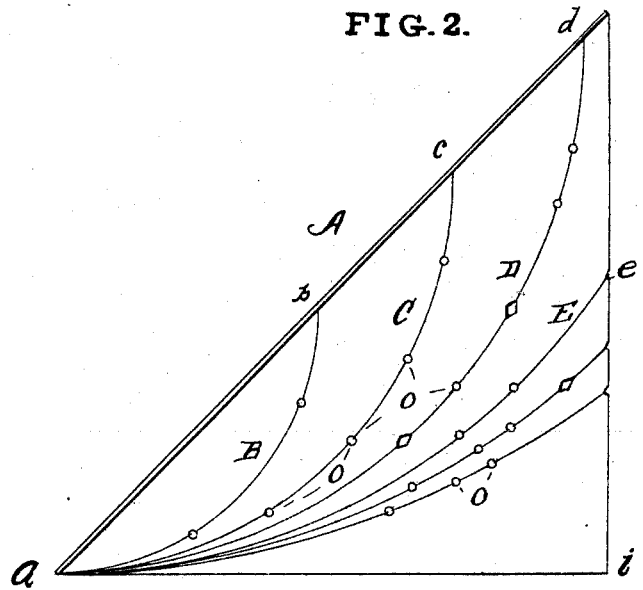
Figure 3:
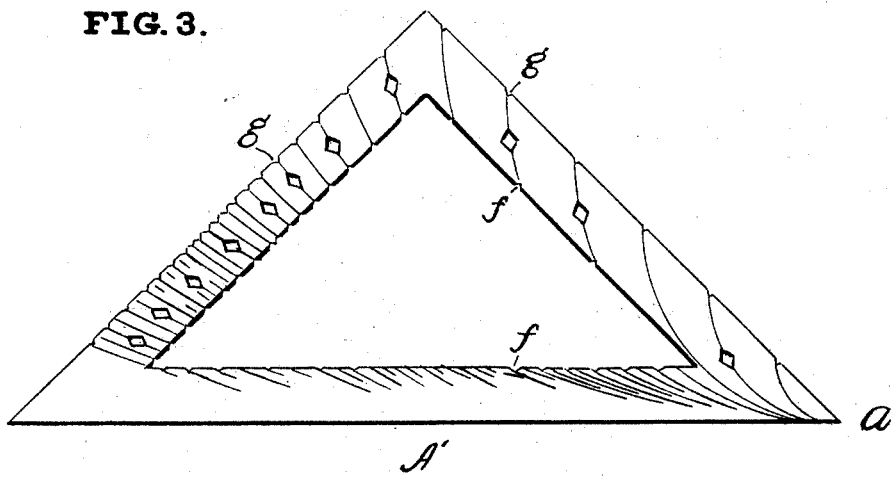
Figure 4:
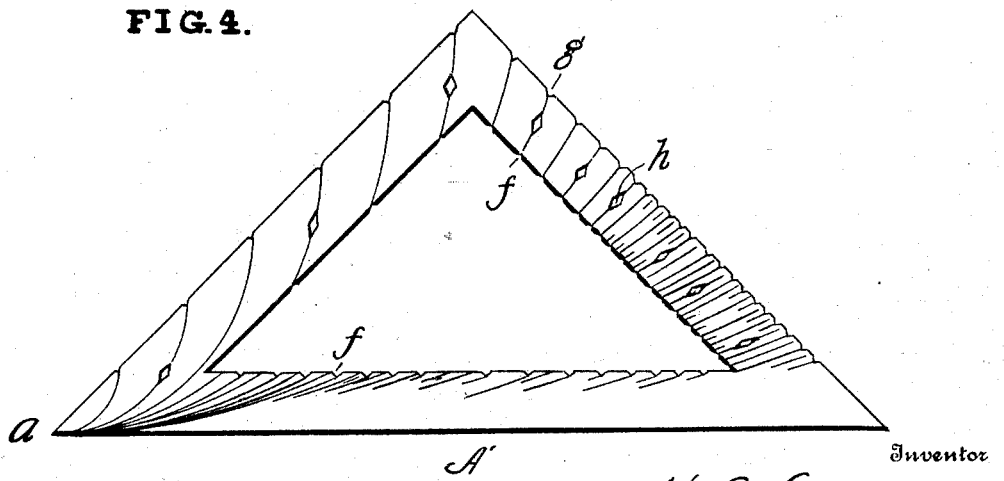

Figure 1 is a plan view of an instrument, showing two sets of curve lines on one face. Fig. 2 is a plan view of a similar implement, showing one set of curve lines on its face. Fig. 3 is a plan of a triangle with right-hand curves and open center; Fig. 4, a plan of a similar triangle with left-hand curves.

Let A indicate a flat triangular piece of rubber, wood, cardboard, or other suitable material. On one face of this "triangle" are a number of curved lines B C D E, &c., all merging at the corner $a$ and extending across the face of the triangle to the boundary thereof at $b$ $c$ $d$ $e$. Along the lines of these curves are a number of perforations $o$ $o$ $o$, arranged in such a manner that when a prick-point is passed through the triangle the point can be noted on a sheet beneath, or observation may be made through the holes $o$. The holes are of any suitable form. If polygonal, opposite angles should be on the line. The triangle can be placed on a drawing, and by marking the points any desirable curve can be readily traced on the map or plat. The sides of the triangle are straight lines, and by this combination of curves and straight lines tangents can be found and drawn with any desired relation to any given curve. As indicated in Fig. 1, the curves B C D are marked in full lines and the reverse curves Z Y X &c., are marked in dotted lines, which merge at the angle $s$. This form of marking is merely adopted for convenience of illustration. The perforations are preferably at the junctions of the reverse curves, especially when both sets of curve lines are shown on the same face of the triangle; but it is quite feasible to have the reverse curves on opposite faces of the triangle. Fig. 2 shows a triangle with curves on one face only, and the opposite face is supposed to have such curves thereon as may be desirable. The same set of perforations may serve as marking-points or as points of observation for curved lines on both faces of the triangle. As indicated in Fig. 1, it would be quite immaterial if the curved dotted lines were on the other side of face of the triangle, since the same perforations mark points on lines merging at opposite corners of the triangle.

To avoid complication in marking, it is desirable to have sets of triangles of same or different size and with curves of different radius marked thereon. A set of about three triangles marked with various curves will meet the requirements of ordinary usage in drafting, platting, laying out railway and stairway curves, and other familiar work in drafting and platting. In such cases the curve lines need not be so close together as to prevent plain indexing and ready reading.

I have described the implement as a triangle; but it is apparent that a body having plane faces on which curved lines are inscribed, with holes along the lines and with boundary composed of straight lines and angles, will meet the requirements of an implement of this character. The necessary indications can be shown on the face of the implement (as "4 6 8") to show the diameter or radius of the arc where the curved lines are arcs of circles.

In the skeleton triangles A', Figs. 3 and 4, the same general idea is involved—that is, the curved lines all converge at one point, as $a$. Where the lines cross the open center of the triangle, the edge of the bar is notched, as at $f$, and the terminal of the line may be indicated by a notch, as at $g$. Such lettering and numbering should be applied to the face of the triangle as to readily indicate the diameter, radius, or other desired designation of the kind of curve as the character of the work warrants. It is desirable that at least one edge of the triangle be left without notches, so as to be used as a ruler.

Diamond-shaped holes $h$ are very convenient for the openings, as they admit of great accuracy in the adjustment of the instrument to a line, observation being taken through the opening.

It will be readily understood that my instrument may be graduated in any well-known way. The object of having a series of instruments with different graduations, as in the preferred form, is to prevent the complication in marking which would result from having a great number of curves and figures on the face of one instrument.

What I claim is—

1. A flat body triangular in outline and having a number of curve lines of different radius marked on the face thereof, the curve lines converging to a single point at one angle of the triangle.

2. A flat body in the form of a triangle, having a number of curve lines converging at one corner or angle of the triangle and thence diverging, the triangle having perforations along the lines of said curves.

3. A drafting implement consisting of a flat body of triangular outline, having a series of curve lines of different radius converging to a single point at an angle or corner of the triangle, and a second series of reverse curve lines converging to a point at another corner or angle of the triangle.

4. A drafting implement consisting of a flat body of triangular outline, having a series of curved lines of different radius converging to a point at one angle of the triangle, and having a notch in the edge of the body at the point remote from said angle where a curved line leaves the edge of said body.

5. A draftsman's implement consisting of a flat body of triangular outline, having a series of curved lines of different radius extending from a point at one angle of the triangle, having an open center, and a notch on the inside of the body-bar within the opening, where a curve leaves said bar.

In testimony whereof I affix my signature in presence of two witnesses.

HENRY A. SWENSON.

Witnesses:
  GEO. L. REIMBOLD,
  JOS. F. REIMBOLD.